May 29, 1956   C. M. L. L. BOURCIER DE CARBON   2,747,695
HORIZONTAL SHOCK ABSORBER WITH RESERVOIR
Filed Oct. 30, 1952                              2 Sheets-Sheet 1
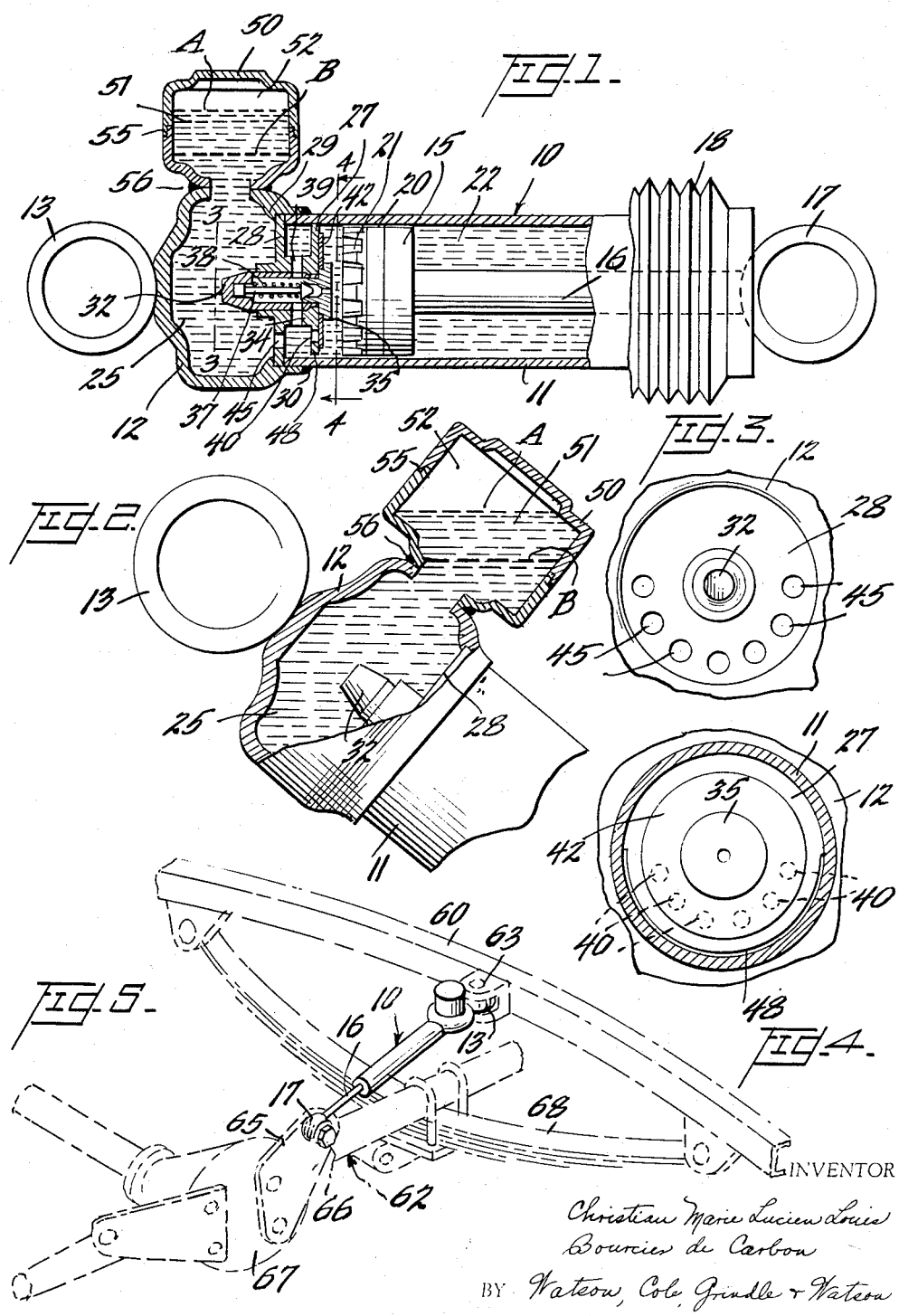
INVENTOR
Christian Marie Lucien Louis
Bourcier de Carbon
BY Watson, Cole, Grindle & Watson
ATTORNEYS May 29, 1956 C. M. L. L. BOURCIER DE CARBON 2,747,695
HORIZONTAL SHOCK ABSORBER WITH RESERVOIR
Filed Oct. 30, 1952 2 Sheets-Sheet 2
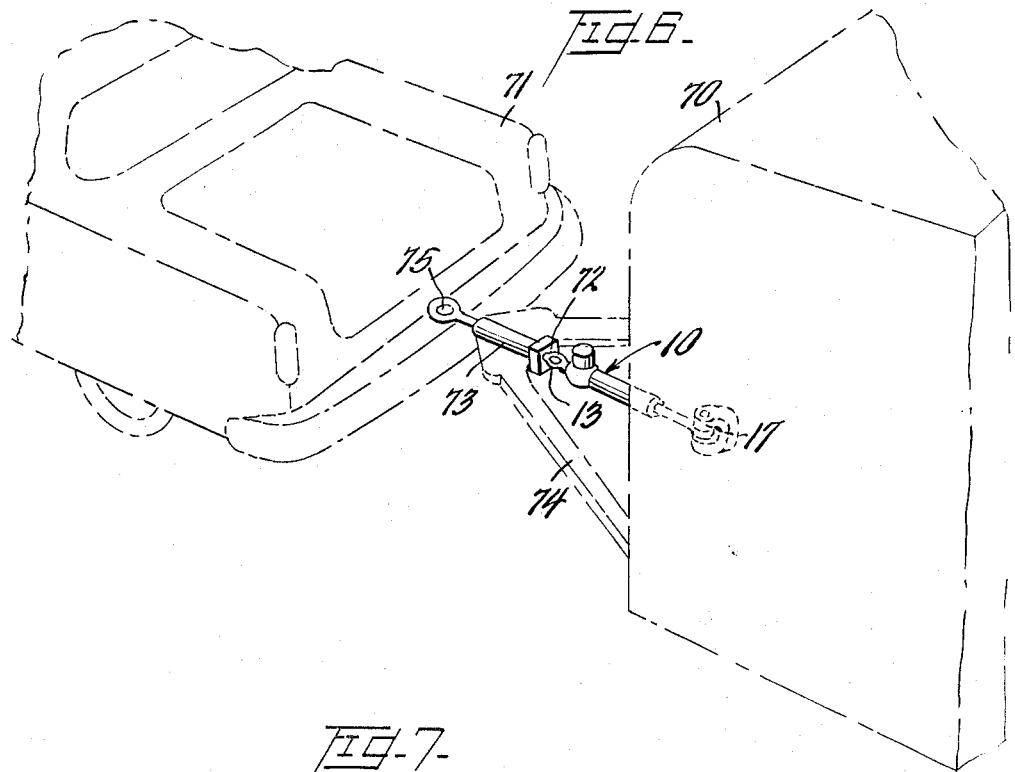
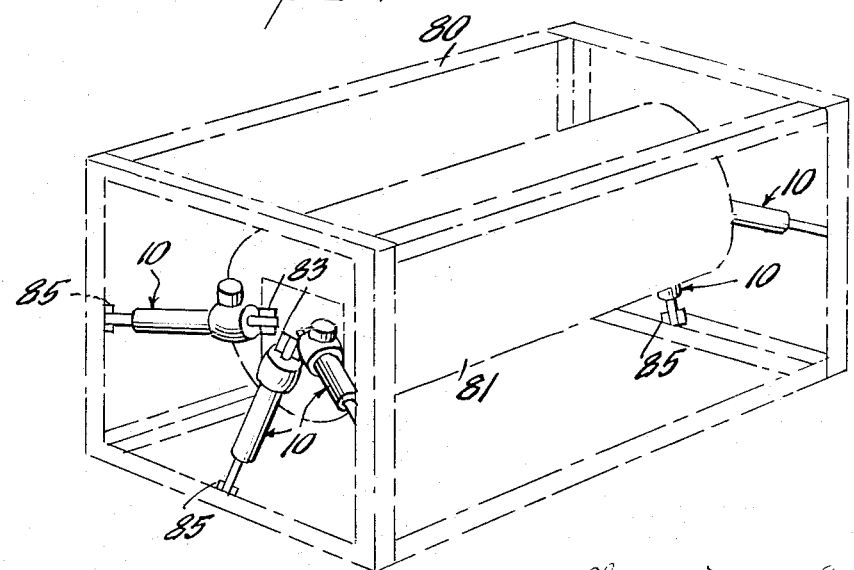
INVENTOR
Christian Marie Lucien Louis
Bourcier de Carbon
BY Watson, Cole, Grindle & Watson
ATTORNEYS United States Patent Office
2,747,695
Patented May 29, 1956

2,747,695

HORIZONTAL SHOCK ABSORBER WITH RESERVOIR

Christian Marie Lucien Louis Bourcier de Carbon, Neuilly-sur-Seine, France

Application October 30, 1952, Serial No. 317,756

12 Claims. (Cl. 188—88)

This invention relates to shock absorbers and more particularly to shock absorbers which are adapted to be disposed in inclined positions or in a horizontal position between the members the relative movement of which is to be damped.

The general object of the invention is to provide a novel and improved shock absorber of the class described.

Numerous practical applications and uses of such a shock absorber will suggest themselves to one skilled in the art. For example, they may be used to minimize sidesway between the chassis and wheel mounting of an automobile; they may be used in connection with a trailer hitch to reduce shock between the towing and towed vehicle in starting, stopping, or changing speed; and they can be used in cushioning delicate instruments or fragile articles within shipping containers to prevent injurious shock from any source.

In its more specific adaptations the novel shock absorber takes the form of a direct-acting, cylinder-and-piston device, one end of the cylinder adapted to be connected to one of the members, and a piston rod extending from the piston through a packed opening in the opposite end of the cylinder. The cylinder is largely filled with a liquid working fluid through which the piston moves, a portion of the liquid being by-passed through graduated or controlled passageways from one side of the piston to the other to exert the damping influence.

In the type of instrument to which the present invention relates, there is provided within the cylinder at the end which is connected with one of the movable members, a reservoir or expansion chamber containing a certain volume of air above the variable liquid level, and adapted to admit and discharge more or less liquid as the piston rod displaces liquid from the working chamber of the cylinder and permits return flow thereto, as successive portions of the rod enter or leave the cylinder during the operation of the device.

This expansion or compensating chamber is separated from the working chamber of the cylinder by a transversely extending partition having openings therethrough which may be valved to throttle the passage of liquid in either or both directions; and provision is made for the arrangement and positioning of these openings so that the shock absorber may function in inclined or horizontal positions without danger of the trapped air within the compensating chamber or reservoir passing into the working chamber and causing cavitation and rendering the instrument inoperative.

A concomitant feature of the invention concerns the provision of a novel baffle plate within the compensating chamber for diverting and breaking the force of any jetting fluid which might be impelled through the partition passageway, and thus preventing any such jets from creating turbulence at the bounding surface between the liquid and the air and consequent foaming or emulsification. The baffle plate according to the invention is provided with openings for aiding in breaking up the streams or currents of liquid but appropriately situated to prevent the passage of air beneath the baffle, in a manner similar to the provisions made with regard to the partition previously described.

An alternative or contemporaneous provision aimed at the attainment of the same general purpose of preventing the air from gaining access to the working chamber when the shock absorber is tilted from the vertical, involves the addition of a dome or protuberance at the side of the expansion chamber portion of the cylinder, which can contain all of the trapped air in most of the tilted positions of the shock absorber.

Other objects and features of novelty will be apparent from the following specification when read in connection with the accompanying drawings in which certain embodiments of the invention are illustrated by way of example.

In the drawings:

Figure 1 is a view partly in side elevation but mainly in vertical longitudinal section of a shock absorber comprising one embodiment of the invention;

Figure 2 is a fragmentary view in side elevation of the shock absorber shown in Figure 1, with a portion shown in vertical section to disclose the fluid levels when the device is operating in an inclined position;

Figure 3 is a fragmnetary view in transverse section taken on line 3—3 of Figure 1;

Figure 4 is a similar view taken on line 4—4 of Figure 1;

Figure 5 is a detail perspective view of a portion of the under-carriage of a motor vehicle showing the shock absorber in use as a side-sway damper;

Figure 6 is a diagrammatic partial perspective view of a trailer hitch in which the novel shock absorber is used, the car and adjacent end portions of the trailer being shown in broken lines; and Figure 7 is a diagrammatic phantom view in perspective of a container for delicate instruments or other fragile contents, the body to be transported being braced against shock in the container by means of the novel shock absorber.

The shock absorber to which the principles of the invention have been applied is somewhat similar to the one illustrated and described in my copending applications Serial No. 145,788, filed February 23, 1950 (now Patent No. 2,719,612, issued October 4, 1955) and Serial No. 252,488, filed October 22, 1951.

Referring to the drawings accompanying this present specification, it will be seen that the shock absorber 10 comprises essentially a generally cylindrical casing 11 which is provided with a slightly enlarged head 12 to which is axially secured a fastening ring 13 for connection with one of the two members, relative movement of which is to be damped. Disposed for reciprocation within the cylindrical casing 11 is the piston 15 which has a piston rod 16 fixed thereto, the rod extending through an opening in the righthand end of the cylinder 11 and terminating in a fastening ring 17 adapted to connect the piston to the other of the two members. The opening in the end of the cylinder through which the piston rod extends is concealed by the protective expansible boot 18 in Figure 1 but may be clearly observed in Figure 5 of the drawings. This opening is packed in any suitable way to prevent leakage of working fluid.

The piston 15 which has been selected for exemplary illustration in the drawings is one which is constructed and functions according to the principles of the inventions described in the above mentioned applications, but the present invention is applicable to shock absorbers having a wide variety of piston structures. The piston 15, however, is one which has an effective periphery which is spaced from the inner wall of the cylindrical casing 11 to provide an extremely thin laminar by-pass clearance space indicated at 20. The piston is centered by the guide ring or flange designated 21. The piston may of course be provided with valve controlled by-pass passageways as in the aforesaid applications or in other arrangements well known in the prior art.

The greater portion of the interior of the cylindrical casing 11 constitutes a working chamber for accommodating the reciprocation of the piston 15 and this working chamber designated 22 is filled with a working fluid in liquid form.

It is readily apparent that upon movement of the piston toward the left-hand end of the cylinder 11, successive portions of the piston rod 16 entering the casing will displace an equivalent amount of working fluid, and to accommodate this displacement and compensate for the increased volume of the piston rod, an expansion chamber or reservoir 25 is disposed largely within the domed head 12 of the casing. A volume of trapped air is contained within the expansion chamber, this air occupying the extreme end of the chamber when the shock absorber is disposed in vertical position, as illustrated in the above mentioned applications, and of course when the instant shock absorber is employed in such vertical positions the air will occupy a space at the extreme outer end of the head 12.

A substantially circular partition plate 27 is disposed transversely within the casing 11, preferably at a point spaced from the point where the head 12 joins the truly cylindrical portion 11. This partition 27 may conveniently be supported by means of the baffle plate 28 which in this embodiment is firmly clamped between the shoulder 29 of the head element 12 and the extreme end of the cylindrical portion of the casing 11, the head element being welded to the cylindrical portion as at 30. The baffle plate 28 is provided with an axial flanged opening through which the tubular post 32 extends, this post being inserted with a force fit to hold it rigidly in place. The partition plate 27 is provided with a central enlarged portion 34 and a central opening which receives the extended end of the hollow post 32. A nut-like member 35 has a central tubular portion extending into the open right-hand end of the hollow post 32 and threaded therein for fixed positioning. The nut 35 is provided with a central passageway communicating with the internal passageway within the post 32. The inner end of the tubular portion of the nut 35 provides a valve seat against which the valve element 37 seats as urged by the coil spring 38. Registering openings in the wall of the hollow post 32 and in the central portion 34 of the partition plate 27 provide radial passageways 39 through which liquid working fluid may pass from the working chamber 22 into the expansion chamber or reservoir 25 when the valve 37 is unseated. As best shown in Figure 4 of the drawings the partition 27 is provided with an arcuate series of openings 40, these openings being for the return flow of fluid from the expansion chamber 25 to the working chamber 22 and they are controlled by the circular disc valve 42 which is centrally clamped to the right-hand face of the partition by means of the head of the nut member 35. It should be noted that the series of openings 40 extend only for approximately half of the periphery of the partition leaving the upper segment of the partition imperforate.

The baffle plate 28 is also provided with a substantially semi-circular series of openings 45 through which fluid may pass from the initial portion of the expansion chamber 25 into the enlarged portion occupying the head 12. The provision of the baffle with its openings is designed to break up any jets or sharp streams of fluid which would tend to cause turbulence or emulsification if continued to the bounding surface between the working liquid and the trapped air.

An optional feature of the invention and one which follows a principle set forth in the copending applications is the provision of a slight marginal clearance or laminar space between the peripheral margin of the partition 27 and the wall of the cylinder 11, this laminar clearance space providing for restricted by-passage of the fluid in a similar way to the space designated 20 around the piston 15. If this expedient is employed in shock absorbers following the principles of the present invention, the laminar clearance space between the partition 27 and the cylinder 11 should not extend much beyond the semi-circular configuration illustrated at 48 in Figure 4 of the drawings. On the other hand, of course, this laminar laminar passageway must be of significant arcuate extent to preserve the principle of viscous damping rather than kinetic damping, when the shock absorber is constructed to follow this principle.

The purpose of restricting the series of openings 45 in the baffle plate 28, the series of openings 40 in the partition 27, and the extent of the peripheral clearance 48 between the partition and the cylinder wall is to provide imperforate portions adjacent the upper substantially semi-circular portion of the device so that when the shock absorber is operated in a horizontal position as indicated in Figure 1, or in an inclined position as suggested in Figure 2, the trapped air will not pass through the baffle and partition into the working chamber 22. The presence of air in the working chamber around the piston would produce dangerous cavitation and interfere seriously with the proper operation of the shock absorber.

A further expedient which may be resorted to for the purpose of preventing air from passing to the working chamber, and one which may be used alone in some cases but which particularly cooperates with the provisions already described, includes the attachment to one side of the head 12 of an extension casing 50 which houses a supplemental expansion chamber 51 to accommodate the maximum and minimum liquid levels and to entirely enclose the volume of trapped air 52 in substantially all operative positions of the piston. This latter provision obviously functions most efficiently when the shock absorber is employed in either a horizontal position as shown in Figure 1 or up to a tilted position such as suggested in Figure 2 of the drawings. The approximate level of the liquid when the piston is in its extreme left-hand position of movement is shown at A and the minimum level as when the piston is in its extreme right-hand position is indicated at B, in both Figures 1 and 2. Thus it will be seen that, at least in the positions illustrated, the volume of air 52 never enters the expansion chamber proper designated 25. Thus, this additional precautionary feature is useful in cooperation with the arrangement of baffle and partition openings and also as an expedient which may be employed alone in conjunction with this particular type of direct acting shock absorber.

The dome-like extension 50 may be made in two parts as by stamping or casting, the junction of the parts being suggested at 55. The inner part is provided with an opening registering with a similar opening in the wall of the head 12 and the parts may be welded securely together as clearly shown at 56 in Figures 1 and 2.

In Figures 5, 6 and 7 of the drawings there are illustrated certain merely suggestive or exemplary applications of the invention to various uses in a horizontal or inclined position.

In Figure 5 one of the shock absorbers 10 is disposed between a side frame member 60 of the running gear of a vehicle (for example a racing car) and the axle or wheel mounting portion 62 thereof. A bracket 63 serves to connect the connecting eye 13 of the shock absorber to the frame 60 and the eye 17 connected to the piston rod 16 is fixed to a plate 65 by means of a bolt 66. The plate 65 is fixedly connected to any portion of the axle or wheel mounting assembly as for example to a differential housing 67. The side frame 60 is supported from axle 62 by means of the conventional leaf spring 68. Any sort of shock absorber arrangement can be used to damp the vertical movement of the parts, but the side-sway is effectively damped by the shock absorber 10.

In Figure 6 of the drawings a shock absorber 10 is associated with a trailer hitch for connecting the trailer 70 with the towing vehicle 71. The hitch, in the illustrated embodiment, comprises a spring-loaded rod 72 which passes through a sleeve 73 carried by the frame 74 attached to the trailer, and secured to the towing vehicle 71 as at 75. The shock absorber 10 has its forward end connecting eye 13 secured to the spring loaded rod 72 and its rear end secured in any suitable way to the trailer 70. The trailer is thus capable of damped movement relative to the towing vehicle 71. One portion of the shock absorber can be fixed by means of a bracket to a brake master cylinder, brake booster, or the like, so that when the towing car is slowing down, the forward motion of the trailer will actuate or compress the shock absorber and this will automatically actuate the braking system of the trailer. Upon increase of speed of the towing car the trailer will separate somewhat therefrom and the brake system will be released.

In Figure 7 of the drawings there is shown in broken lines a packing crate or box 80 in which there is disposed an article or instrument 81 for shipment or storage. If the article or lading 81 is of a fragile or delicate nature, it may be suspended at points spaced from the walls of the container 80 and shock insulated therefrom by the use of a plurality of shock absorbers 10, the shock absorbers each having one end connected to the lading 81 as at 83 and the other end connected to portions of the crate or box 80 as at 85. In this way, if the container should be dropped, the substantially vertically disposed shock absorber will damp the vertical impact and whenever the container is bumped horizontally the horizontally disposed shock absorbers will damp on such impact. This arrangement is useful in handling articles and instruments destined for the armed services, where it is understood that the requirement is that instruments of fragile nature be not subjected to an impact greater than 5 to 10 G.

It is understood that various changes and modifications may be made in the embodiments illustrated and described herein without departing from the scope of the invention as defined by the following claims.

Having thus described the invention, what is claimed as new and desired to be secured by Letters Patent is:

1. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, a plurality of openings through said partition, said openings occurring only upon one side of the area of the partition, the segment of the partition which is uppermost when the cylinder is tilted for operation out of the vertical position being imperforate; a radially extending baffle plate within the expansion chamber, said plate being provided with a plurality of openings, the perforated baffle plate serving to break up currents of working fluid which may pass into the expansion chamber during operation, said openings occurring only upon one side of the area of the plate, the segment of the plate which is uppermost when the cylinder is tilted being imperforate; and a bulbous extension on the side of the cylinder adjacent the portion thereof within which the expansion chamber is located, said extension containing a supplemental chamber, and a passageway providing free communication between said expansion chamber and said supplemental chamber, the extension being on the side of the cylinder which is uppermost when tilted, all whereby in most positions of tilted operation the trapped air will be contained in the bulbous extension chamber and in all positions of tilted operation the air will be prevented from passing from the expansion chamber into the working chamber.

2. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, an arcuate series of openings through said partition, said series extending around said partition for only approximately one-half of the circular extent thereof, the segment of the partition which is uppermost when the cylinder is tilted for operation out of the vertical position being imperforate; a radially extending baffle plate within the expansion chamber, said plate being provided with an arcuate series of openings, the perforated baffle plate serving to break up currents of working fluid which may pass into the expansion chamber during operation, said openings occurring only upon one side of the area of the plate, the segment of the plate which is uppermost when the cylinder is tilted being imperforate; and a bulbous extension on the side of the cylinder adjacent the portion thereof within which the expansion chamber is located, said extension containing a supplemental chamber, and a passageway providing free communication between said expansion chamber and said supplemental chamber, the extension being on the side of the cylinder which is uppermost when tilted, all whereby in most positions of tilted operation the trapped air will be contained in the bulbous extension chamber and in all positions of tilted operation the air will be prevented from passing from the expansion chamber into the working chamber.

3. The shock absorber as set forth in claim 2 in which the peripheral margin of said partition is spaced from the inner wall of the cylinder for a portion of its circular extent to provide a slight arcuate clearance space for flow of fluid between said working and expansion chambers, said clearance space being not substantially more than semi-circular in extent and occurring on the lower segment of the partition when the device is in tilted or horizontal positions.

4. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, a plurality of openings through said partition, said openings occurring only upon one side of the area of the partition, the segment of the partition which is uppermost when the cylinder is tilted for operation out of the vertical position being imperforate; whereby in all positions of tilted operation the air will be prevented from passing from the expansion chamber into the working chamber.

5. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, a plurality of openings through said partition, said openings occurring only upon one side of the area of the partition, the segment of the partition which is uppermost when the cylinder is tilted for operation out of the vertical position being imperforate; a radially extending baffle plate within the expansion chamber, said plate being provided with a plurality of openings, the perforated baffle plate serving to break up currents of working fluid which may pass into the expansion chamber during operation, said openings occurring only upon one side of the area of the plate, the segment of the plate which is uppermost when the cylinder is tilted being imperforate; whereby in all positions of tilted operation the air will be prevented from passing from the expansion chamber into the working chamber.

6. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, a plurality of openings through said partition, said openings occurring only upon one side of the area of the partition, the segment of the partition which is uppermost when the cylinder is tilted for operation out of the vertical position being imperforate; and a bulbous extension on the side of the cylinder adjacent the portion thereof within which the expansion chamber is located, said extension containing a supplemental chamber, and a passageway providing free communication between said expansion chamber and said supplemental chamber, the extension being on the side of the cylinder which is uppermost when tilted, all whereby in most positions of tilted operation the trapped air will be contained in the bulbous extension chamber and in all positions of tilted operation the air will be prevented from passing from the expansion chamber into the working chamber.

7. A hydraulic shock absorber of the class described comprising, in combination, a cylinder closed at one end and containing a working fluid in liquid form, a piston disposed for reciprocation in the cylinder, a piston rod having one of its ends secured to said piston and extending through an opening in the opposite end of said cylinder, means providing for the restricted by-passage of working fluid from one side to the other of the piston during reciprocation of the latter in the cylinder in operation; a partition extending transversely of the cylinder setting off an auxiliary expansion chamber within the first named end of the cylinder from the working chamber in which the piston reciprocates, said expansion chamber containing a volume of trapped air above the variable surface level of the liquid working fluid and adapted to compensate for the displacement of the piston rod as it moves into and out of the cylinder, a plurality of openings through said partition; and a bulbous extension on the side of the cylinder adjacent the portion thereof within which the expansion chamber is located, said extension containing a supplemental chamber, and a passageway providing free communication between said expansion chamber and said supplemental chamber, the extension being on the side of the cylinder which is uppermost when tilted, whereby in most positions of tilted operation the trapped air will be contained in the bulbous extension chamber and will be prevented from passing from the expansion chamber into the working chamber.

8. For use in a shock absorber of the class described, the sub-combination of a partition and baffle assembly comprising parallel plates fixedly connected together and adapted to be secured within the cylinder of the shock absorber in a transverse position, one of said plates comprising a partition element for setting off the working chamber from an expansion chamber of the shock absorber and the other plate comprising a baffle element containing perforations permitting the passage of working fluid therethrough but serving to break up jets and streams of fluid in order to minimize turbulence, said partition plate also being provided with openings for the passage of fluid from one of said chambers to the other, the openings in both of said plates being disposed substantially upon one side of parallel diameters of said plates only, whereby approximately one-half of the area of both plates is imperforate, such area adapted to occupy the uppermost position when the shock absorber is operating in a tilted or horizontal position.

9. As an article of manufacture, for use in a shock absorber of the class described, a partition element adapted to be fixedly disposed within the cylinder of the shock absorber so as to extend transversely thereof, a central valved opening in said partition for the purpose of permitting passage of fluid from one chamber of said shock absorber to the other when said partition is installed, a valve element disposed within said central opening and adapted to control the flow of fluid therethrough, an arcuate series of valved openings in said partition plate between the center and the periphery thereof and of an extent not more than semi-circular whereby substantially one-half of the area of said partition plate is imperforate, said imperforate area adapted to occupy the uppermost position when the shock absorber is operating in a tilted or horizontal position.

10. The partition element as set forth in claim 9 in which the peripheral margin of the partition plate is for the most part circular, but having a cut-away portion inset slightly from the basic circular periphery, said portion being of an extent not substantially more than semi-circular, said cut-away portion adapted to be located upon the lower portion of the periphery when the shock absorber is operated in tilted or horizontal positions.

11. As an article of manufacture for use in a shock absorber of the class described, a partition element adapted to be fixedly disposed within the cylinder of the shock absorber so as to extend transversely thereof, at a point remote from the piston and piston rod of such shock absorber, a central valved opening in said partition for the purpose of permitting passage of fluid from one chamber of said shock absorber to the other when said partition is installed, a valve element disposed within said central opening and adapted to control the flow of fluid therethrough, said valve element being the sole means encumbering said opening, an arcuate series of valved openings in said partition plate between the center and the periphery thereof and of an extent not more than semi-circular whereby substantially one-half of the area of said partition plate is imperforate, said imperforate area adapted to occupy the uppermost position when the shock absorber is operating in a tilted or horizontal position.

12. In a shock absorber of the class described, a cylinder containing working fluid in liquid form, a piston disposed for reciprocation in the cylinder and a partition element fixedly disposed within the cylinder so as to extend transversely thereof and divide the cylinder into a working chamber in which the piston reciprocates, and an auxiliary expansion chamber at one end of the cylinder, a central valved opening in the partition plate permitting passage of fluid from one of said chambers to the other, one or more valved openings in the partition plate upon one side of the center thereof and adapted to occupy the lower half of the area of said partition plate when the shock absorber is installed in inclined or horizontal position, the peripheral margin of the partition plate being for the most part circular, but having a cut-away portion inset slightly from the basic circular periphery, said portion being of an extent not substantially more than semi-circular, said cut-away portion adapted to be located upon the lower portion of the periphery when the shock absorber is operated in tilted or horizontal positions.

References Cited in the file of this patent

UNITED STATES PATENTS

| | | |
|---|---|---|
| 2,031,000 | Mercier | Feb. 18, 1936 |
| 2,089,657 | Mercier | Aug. 10, 1937 |
| 2,334,115 | Meredith | Nov. 9, 1943 |
| 2,673,731 | Patriquin | Mar. 3, 1954 |

FOREIGN PATENTS

| | | |
|---|---|---|
| 296,897 | Great Britain | Sept. 13, 1928 |